United States Patent

Bostelmann et al.

[11] Patent Number: 5,850,764
[45] Date of Patent: Dec. 22, 1998

[54] CRANKSHAFT DRIVE FOR AN INTERNAL COMBUSTION ENGINE

[75] Inventors: Willy Bostelmann, Wels; Claus Holweg, Murau, both of Austria

[73] Assignee: Bombardier-Rotax Gesellschaft m.b.h., Gunskirchen, Austria

[21] Appl. No.: 766,376

[22] Filed: Dec. 12, 1996

[30] Foreign Application Priority Data

Dec. 22, 1995 [AT] Austria ................................ a 2093/95

[51] Int. Cl.$^6$ ............................. F02B 75/06; F16F 15/26
[52] U.S. Cl. .......................................... 74/603; 123/192.2
[58] Field of Search ............................. 74/603, 604, 589, 74/590, 591; 123/192.2, 192.1

[56] References Cited

U.S. PATENT DOCUMENTS

| 1,337,081 | 4/1920 | Kuhn ......................................... 74/603 |
| 3,145,695 | 8/1964 | Conover et al. ...................... 123/192.2 |
| 4,125,036 | 11/1978 | Nakamura et al. ........................ 74/604 |
| 4,523,553 | 6/1985 | Backlund .............................. 123/192.2 |
| 4,574,749 | 3/1986 | Negre ..................................... 74/603 X |
| 4,683,849 | 8/1987 | Brown .................................. 123/192.2 |
| 5,230,311 | 7/1993 | Kuhn et al. .......................... 123/192.2 |

FOREIGN PATENT DOCUMENTS

| 1106744 | 12/1955 | France ................................. 123/192.1 |
| 2456841 | 1/1981 | France ...................................... 74/603 |
| 41 03 387 | 1/1992 | Germany ................................. 74/591 |
| 6193682 | 7/1994 | Japan ....................................... 74/591 |
| 75379 | 8/1954 | Netherlands ........................ 123/192.1 |

Primary Examiner—Charles A. Marmor
Assistant Examiner—Mary Ann Battista
Attorney, Agent, or Firm—Collard & Roe, P.C.

[57] ABSTRACT

A crankshaft drive in an internal combustion engine, which comprises at least one cylinder having a cylinder head, and a crankcase housing a crankshaft rotating at a predetermined direction and at a predetermined speed, and a balance shaft extending parallel to the crankshaft and rotating at the predetermined speed of the crankshaft in a direction opposite to the predetermined rotating direction of the crankshaft, the crankshaft and the balance shaft carrying balance weight means for balancing a mass of first order. An auxiliary shaft extends parallel to the crankshaft and rotates at the predetermined speed of the crankshaft in the predetermined rotating direction of the crankshaft, the auxiliary shaft carrying a counterweight for balancing a residual moment resulting from the rotating balance shaft with respect to the rotating crankshaft.

6 Claims, 3 Drawing Sheets

CRANKSHAFT DRIVE FOR AN INTERNAL COMBUSTION ENGINE

BACKGROUND OF THE INVENTION

1. Field of the Invention

This invention relates to a crankshaft drive for an internal combustion engine, comprising at least one cylinder with a cylinder head as well as a crankcase with a crankshaft and a balancer shaft parallel to the crankshaft and rotating in opposite direction, which like the crankshaft carries balance weights for the mass balance of the first order.

2. Description of the Prior Art

To not only balance out the rotating inertial forces of a crankshaft drive, but also consider the reciprocating inertial forces thereof, it is known to provide in the crankcase a balancer shaft parallel to the crankshaft and rotating in opposite direction, where the balance weights of said balancer shaft together with the forces of the crankshaft produce a resultant force, which corresponds to the reciprocating inertial forces of the crankshaft drive, but is directed opposite thereto. In the case of high-speed internal combustion engines, as they are used for instance for motorcycles, vibrations may occur despite this balancer shaft, which exceed a tolerable degree and have a considerable content of vibrations of the first order.

SUMMARY OF THE INVENTION

It is therefore the object underlying the invention to design a crankshaft drive of the type described above such that the content of vibrations of the first order can be suppressed with comparatively simple constructive measures.

This object is solved by the invention in that for balancing out the residual moment of the balancer shaft produced with respect to the crankshaft there is provided an additional auxiliary shaft parallel to the crankshaft and rotating in the same direction, which comprises a counterweight balanced out by the crankshaft.

Since for reasons of design there is required a distance of the balancer shaft from the crankshaft, the balance weights of this balancer shaft produce a residual moment about the crankshaft, which leads to a corresponding stimulation of vibrations in particular at higher speeds. By means of a counterweight of an additional auxiliary shaft likewise disposed parallel to the crankshaft there can now be produced a counter-moment eliminating the residual moment of the balancer shaft in the crankcase, when this counterweight rotates opposite to the balancer shaft, i.e. in the same direction as the crankshaft. Although the torques about the crankshaft can be balanced out by means of the counterweight of the auxiliary shaft, the additional mass obtained by means of this counterweight must be considered during a mass balance of the first order, namely such that no additional inertial forces are produced by the required balancing. This means that the mass balance must become effective coaxially to the crankshaft, which can be ensured very easily in that the crankshaft itself constitutes such mass balance, so that a complete mass balance of the first order can be achieved for the crankshaft drive with the advantage of a substantial suppression of vibrations. Thus, the torque produced by the couple of forces of the auxiliary shaft and the crankshaft acts against the moment produced by the couple of forces of the balancer shaft and the crankshaft.

Since it is merely important to provide a corresponding counter-moment against the residual moment of the balancer shaft, the position of the auxiliary shaft carrying the counterweight can be chosen independent of the position of the balancer shaft. In accordance with a further embodiment of the invention it is, for instance, possible to support the auxiliary shaft on the cylinder head, preferably in the cylinder head space receiving the camshafts, and drive it via the camshaft drive. By means of this measure a comparatively large distance is achieved between the crankshaft and the auxiliary shaft, which has the advantage that due to this large distance the counterweight for a certain torque about the crankshaft can be kept small. In addition, there is obtained a compact construction with a simple drive for the auxiliary shaft, which need merely be derived from the camshaft drive present in any case.

Supporting the auxiliary shaft on the cylinder head also creates the possibility of ventilating the generally closed cylinder head space receiving the auxiliary shaft, without having to fear a leakage of oil. For this purpose the auxiliary shaft need merely be provided with an axial blind hole, from which preferably adjacent the counterweight there extends at least one transverse hole opening in the cylinder head space. Since the oil cannot penetrate into the radial bore against the centrifugal force, a simple oil barrier is obtained despite a possible exchange of air.

BRIEF DESCRIPTION OF THE DRAWING

In the drawing, the subject-matter of the invention is represented by way of example, wherein.

DESCRIPTION OF THE PREFERRED EMBODIMENT

Figure 1:
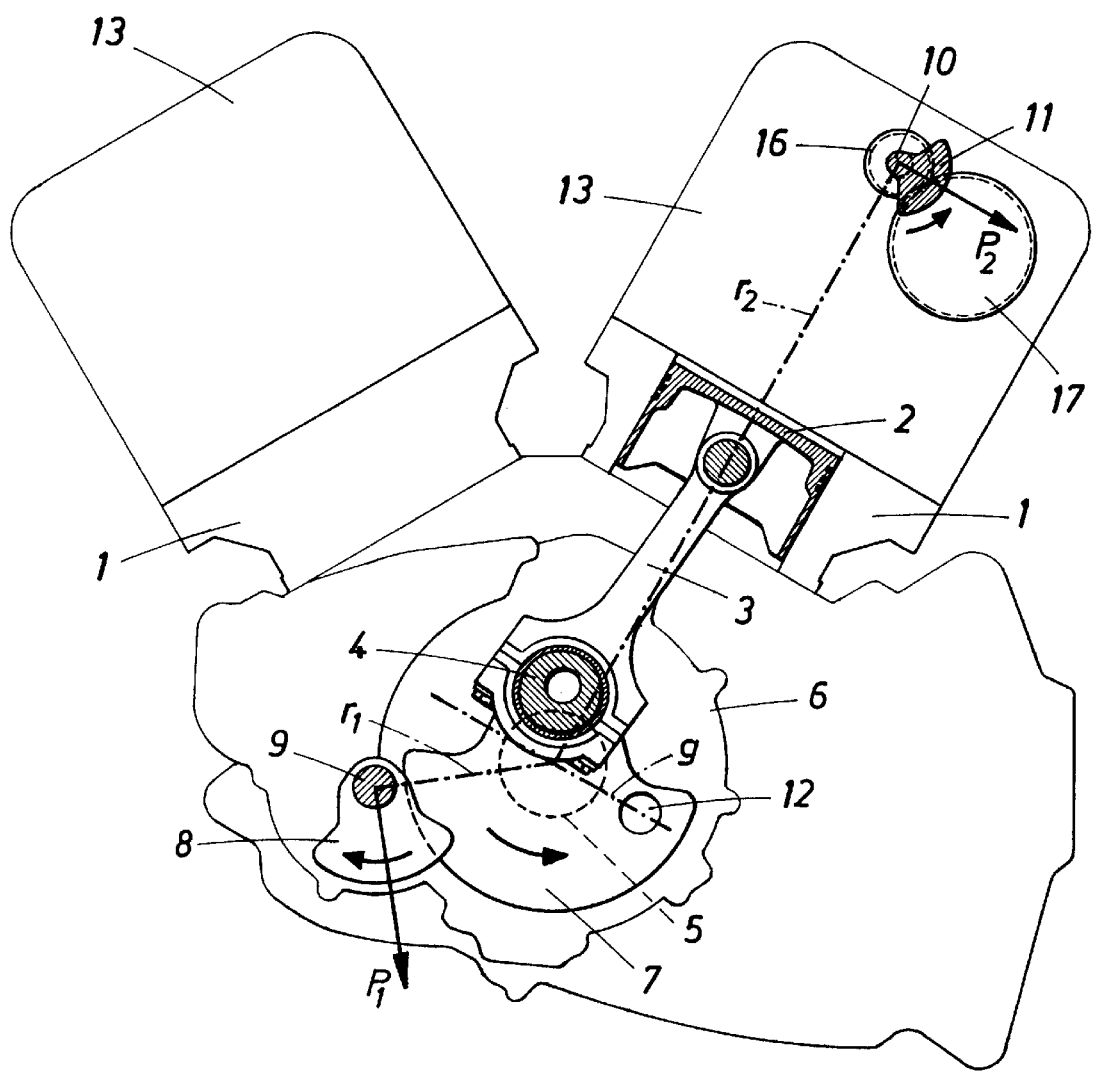
FIG. 1 shows a crankshaft drive in accordance with the invention in a schematic section through the crankcase and the cylinder of an internal combustion engine.
Figure 2:
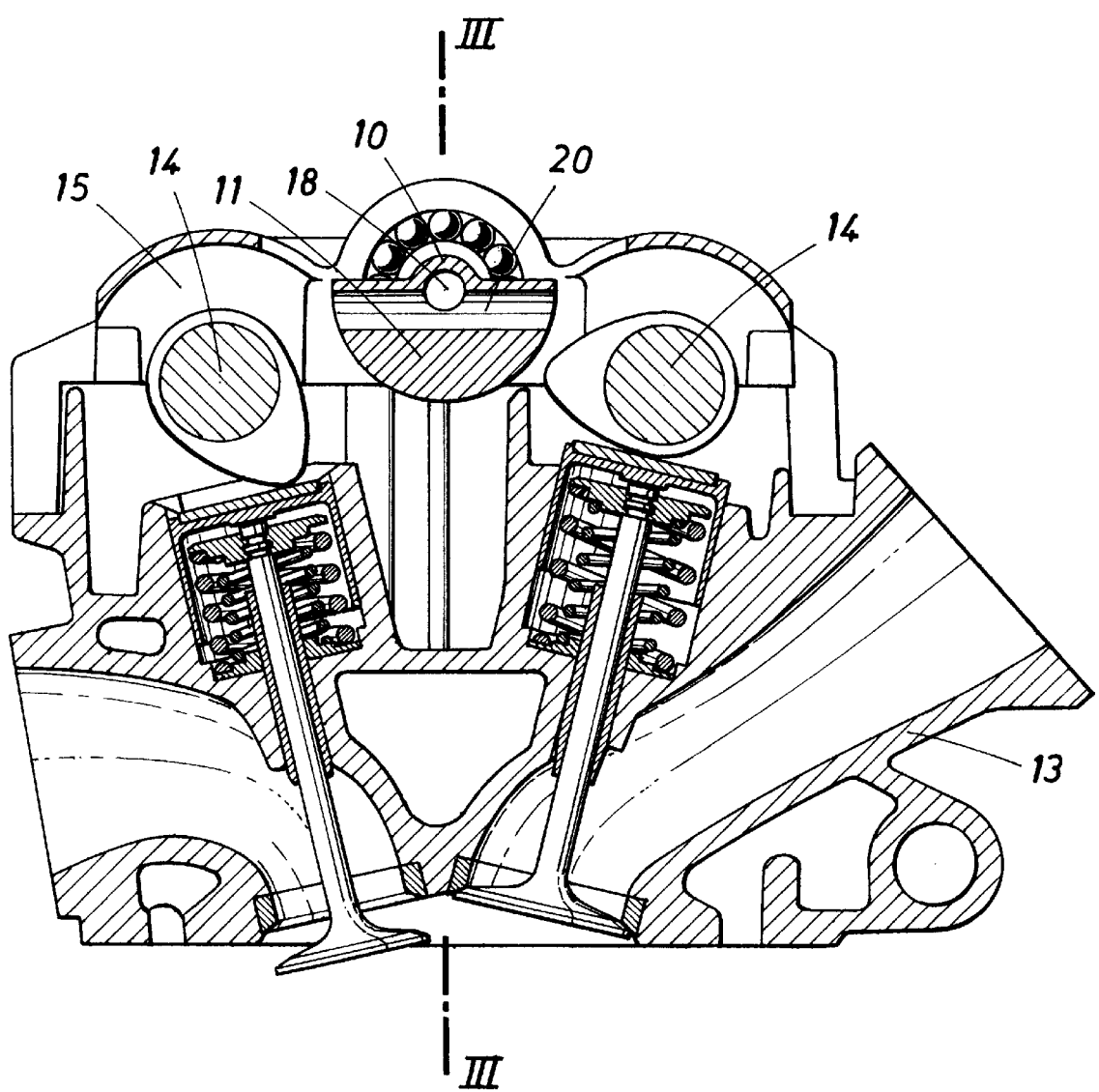
FIG. 2 shows a section through the cylinder head of the internal combustion engine in a larger scale.
Figure 3:
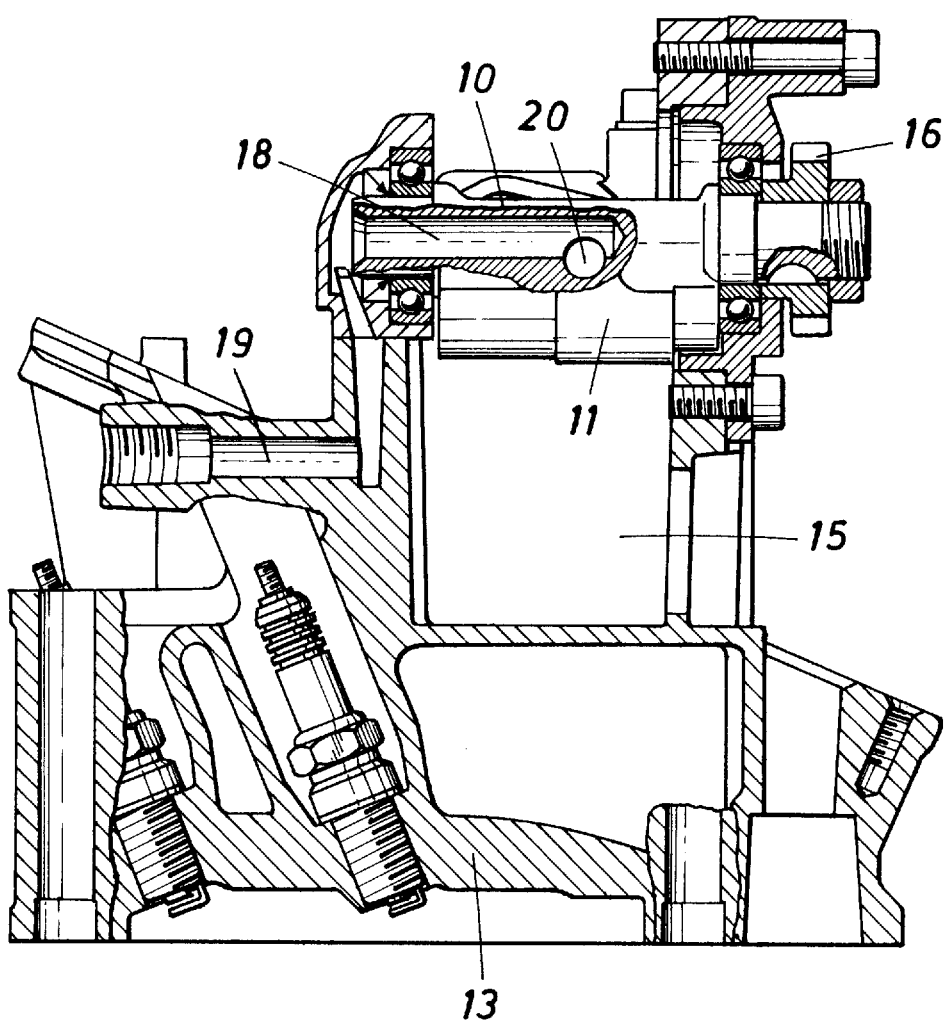
FIG. 3 shows a section along line III—III of FIG. 2.

In the illustrated embodiment the crankshaft drive for a motorcycle is driven by an internal combustion engine with two cylinders 1, whose piston 2 acts on the crank pin 4 of a crankshaft 5 via a connecting rod 3, which crankshaft is supported in a crankcase 6. For balancing out the rotating and the reciprocating inertial forces of this crankshaft drive, the balance weights 7 provided on the crank webs cooperate with balance weights 8 of a balancer shaft 9 likewise mounted in the crankcase 6, which balancer shaft rotates at the same speed, but opposite to the crankshaft 5. Although with a corresponding adjustment of the balance weights 7 and 8 a mass balance of the first order can largely be achieved, disturbing vibrations with a considerable content of vibrations of the first order may occur in particular at higher speeds due to a residual moment about the crankshaft 5 as a result of the balance weights 8 of the balancer shaft 9. To produce a torque acting against this residual moment, an auxiliary shaft 10 with a corresponding counterweight 11 is provided, which must rotate opposite to the balancer shaft 9. By means of this additional counterweight 11 the residual moment of the balance weights 8 about the crankshaft 5 can be balanced out, but the additional mass resulting from this counterweight 11 must also be balanced out. For this purpose, the crankshaft 5 constitutes the balance weight required for this mass balance, which can become effective as an additional mass on the side of the crankshaft 5 located opposite with respect to the axis of rotation of the counterweight 11. Particularly advantageous conditions are achieved, however, when the mass balance is achieved by a reduction of the mass of the balance weights 7 of the crankshaft 5 on the side of the counterweight 11. The recess 12 in the balance weights 7 thus effects a corresponding mass balance.

Since the residual moment of the balance weights 8 of the balancer shaft 9 is largest when the centrifugal forces $P_1$ of the balance weights 8 radial to the balancer shaft 9 are vertical to the radius $r_1$ of the axis of rotation formed by the crankshaft 5, the centrifugal force $P_2$ of the counterweight 11 of the auxiliary shaft 10 must also extend vertical to a radius $r_2$ in this position of the crankshaft drive, as this is illustrated in FIG. 1. The center of gravity of the mass balance for the counterweight 11 must therefore lie on a straight line g vertical to the radius $r_2$, namely on the side of this radius $r_2$ opposite the counterweight 11. This means that the recess 12 must be provided on the side of the counterweight.

Since the load moment $P_2 \cdot r_2$ should be selected opposite and equal for balancing out the residual moment $P_1 \cdot r_1$, the counterweight 11 can be chosen smaller with increasing distance $r_2$. Therefore, a comparatively large distance $r_2$ is recommended, which can advantageously be ensured when the auxiliary shaft 10 is supported on the cylinder head 13, namely in the cylinder head space 15 receiving the camshafts 14, so that the drive for the auxiliary shaft 10 can be derived from the camshaft drive. For this purpose, a gearwheel 16 is arranged on the auxiliary shaft 10, which meshes with a gearwheel 17 of the camshaft drive.

The arrangement of the auxiliary shaft 10 in the cylinder head space 15 also provides the possibility of ventilating this space without having to fear a leakage of oil. For this purpose, the auxiliary shaft 10 is provided with an axial blind hole 18, which opens into a ventilation passage 19 communicating with the air filter. A transverse hole 20 extending through the counterweight 11 proceeds from this blind hole 18, so that this transverse hole provides for a ventilation of the cylinder head space 15, but oil from this cylinder head space 15 cannot escape against the centrifugal force.

We claim:

1. A crankshaft drive in an internal combustion engine, which comprises
   (a) at least one cylinder having a cylinder head,
   (b) a crankcase supporting inside thereof
      (1) a crankshaft rotating at a predetermined direction and at a predetermined speed, and
      (2) a balance shaft extending parallel and closely adjacent to the crankshaft and rotating at the predetermined speed of the crankshaft in a direction opposite to the predetermined rotating direction of the crankshaft,
      (3) the crankshaft and the balance shaft carrying balance weight means for balancing a mass of first order, and
   (c) an auxiliary shaft outside the crankcase and extending parallel to the crankshaft and rotating at the predetermined speed of the crankshaft in the predetermined rotating direction of the crankshaft,
      (1) the auxiliary shaft carrying a counterweight for balancing a residual moment resulting from the rotating balance shaft with respect to the rotating crankshaft.

2. The crankshaft drive of claim 1, wherein the auxiliary shaft is supported on the cylinder head.

3. The crankshaft drive of claim 2, wherein the cylinder head defines a space, further comprising a camshaft drive in the cylinder head space for driving the auxiliary shaft.

4. The crankshaft drive of claim 1, wherein the balance weight means of the crankshaft defines a recess balancing the counterweight of the auxiliary shaft.

5. A crankshaft drive in an internal combustion engine, which comprises
   (a) at least one cylinder having a cylinder head defining a space,
   (b) a crankcase housing
      (1) a crankshaft rotating at a predetermined direction and at a predetermined speed, and
      (2) a balance shaft extending parallel to the crankshaft and rotating at the predetermined speed of the crankshaft in a direction opposite to the predetermined rotating direction of the crankshaft,
      (3) the crankshaft and the balance shaft carrying balance weight means for balancing a mass of first order,
   (c) an auxiliary shaft supported on the cylinder head and extending parallel to the crankshaft and rotating at the predetermined speed of the crankshaft in the predetermined rotating direction of the crankshaft, the auxiliary shaft
      (1) carrying a counterweight for balancing a residual moment resulting from the rotating balance shaft with respect to the rotating crankshaft, and
      (2) an axial blind hole opening outside the cylinder head space, and at least one bore extending transversely thereto from the blind hole to communicate with the cylinder head space, and
   (d) a camshaft drive in the cylinder head space for driving the auxiliary shaft.

6. The crankshaft drive of claim 5, wherein the transversely extending bore is disposed adjacent the counterweight of the auxiliary shaft.

* * * * *